(12) United States Patent
Sugiura et al.

(10) Patent No.: US 9,533,627 B2
(45) Date of Patent: Jan. 3, 2017

(54) DECORATIVE MEMBER FOR VEHICLE

(71) Applicant: TOYODA GOSEI CO., LTD., Kiyosu-shi, Aichi-ken (JP)

(72) Inventors: Tatsuya Sugiura, Kiyosu (JP); Hideto Maeda, Kiyosu (JP); Kimihiro Iimura, Kiyosu (JP); Daiichiro Kawashima, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 121 days.

(21) Appl. No.: 14/453,787

(22) Filed: Aug. 7, 2014

(65) Prior Publication Data

US 2015/0086731 A1 Mar. 26, 2015

(30) Foreign Application Priority Data

Sep. 26, 2013 (JP) ................. 2013-200454

(51) Int. Cl.
*B60R 13/04* (2006.01)
*B32B 37/18* (2006.01)
(Continued)

(52) U.S. Cl.
CPC ............... *B60R 13/04* (2013.01); *B32B 37/18* (2013.01); *B32B 38/0012* (2013.01);
(Continued)

(58) Field of Classification Search
CPC ...... B60R 13/005; B60R 13/04; B44C 5/0415; B44C 1/1716; B44C 1/1729; C08J 5/124; G01S 13/93; G01S 2007/027; B32B 37/18; B32B 38/0012; B32B 38/145; H01Q 1/42; Y10T 156/1002; Y10T 428/14; Y10T 428/28; Y10T 428/1438; Y10T 428/1443; Y10T 428/1448; Y10T 428/1486; Y10S 428/9133; Y10S 428/914
See application file for complete search history.

(56) References Cited

U.S. PATENT DOCUMENTS 3,432,376 A * 3/1969 Lennox ............... B41M 5/10
156/234
4,012,552 A * 3/1977 Watts ............... B41M 3/12
156/233
(Continued)

FOREIGN PATENT DOCUMENTS

JP S56-055283 A 5/1981
JP S61-202841 A 9/1986
(Continued)

OTHER PUBLICATIONS

Extended European Search Report dated Feb. 27, 2015 issued in corresponding EP patent application No. 14180660.4.
(Continued)

*Primary Examiner* — Patricia L Nordmeyer
(74) *Attorney, Agent, or Firm* — Posz Law Group, PLC (57) ABSTRACT

A vehicular decorative member is curved as a forward-bulging shape, and includes a transparent base, a transferred layer, a metallic layer, and a base layer. The transparent base includes a front face, and a rear face. The transparent base's rear face has an ordinary section, and a recessed section. The transferred layer, the metallic layer, and the base layer are disposed on the transparent base's rear-face side in this order. The vehicular decorative member further includes a transfer sheet turning into the transferred layer. The transfer sheet includes a support film, and an adhesive layer, a decorative layer and a release layer that are formed on the support film in this order. The transfer sheet makes the transferred layer when the support film is removed from the release layer after pressing the transfer sheet onto the transparent base's ordinary section while heating the transfer sheet.

6 Claims, 9 Drawing Sheets

(51) Int. Cl.
- *B32B 38/00* (2006.01)
- *B60R 13/00* (2006.01)
- *B44C 5/04* (2006.01)
- *G01S 13/93* (2006.01)
- *B44C 1/17* (2006.01)
- *C09J 7/02* (2006.01)
- *H01Q 1/42* (2006.01)
- *G01S 7/02* (2006.01)

(52) U.S. Cl.
CPC .......... *B32B 38/145* (2013.01); *B44C 1/1716* (2013.01); *B44C 1/1729* (2013.01); *B44C 5/0415* (2013.01); *B60R 13/005* (2013.01); *C09J 7/0292* (2013.01); *G01S 13/93* (2013.01); *G01S 2007/027* (2013.01); *H01Q 1/42* (2013.01); *Y10T 156/1002* (2015.01); *Y10T 428/14* (2015.01)

(56) References Cited

U.S. PATENT DOCUMENTS

| | | | | |
|---|---|---|---|---|
| 4,415,623 A | * | 11/1983 | Schlaepfer | B44C 1/10 156/230 |
| 5,489,355 A | * | 2/1996 | Shimizu | B44C 1/14 156/230 |
| 5,599,416 A | * | 2/1997 | Kuwahara | A41D 27/08 156/219 |
| 5,795,527 A | * | 8/1998 | Nakamura | B29C 37/0025 156/221 |
| 8,816,932 B2 | * | 8/2014 | Kawaguchi | C23C 14/0015 235/487 |
| 2002/0142111 A1 | * | 10/2002 | Auld | B44C 3/02 428/13 |
| 2006/0262003 A1 | | 11/2006 | Kamiya et al. | |
| 2011/0088827 A1 | | 4/2011 | Zanini et al. | |

FOREIGN PATENT DOCUMENTS

| | | |
|---|---|---|
| JP | H05-057710 A | 3/1993 |
| JP | 2005-343172 A | 12/2005 |
| JP | 2012-111045 A | 6/2012 |
| WO | 2012/111242 A1 | 8/2012 |

OTHER PUBLICATIONS

Office Action issued Jan. 19, 2016 in the corresponding JP application No. 2013-200454.

* cited by examiner

DECORATIVE MEMBER FOR VEHICLE

INCORPORATION BY REFERENCE

The present invention is based on Japanese Patent Application No. 2013-200454, filed on Sep. 26, 2013, the entire contents of which are incorporated herein by reference.

BACKGROUND OF THE INVENTION

Field of the Invention

The present invention relates to a decorative member for vehicle, decorative member which is used for electromagnetic-wave transmission covers disposed in front of millimeter-electromagnetic-wave radar, for instance.

Description of the Related Art

Auto-cruising systems are an engineering technique for controlling inter-vehicular distance, or distance between two vehicles. An auto-cruising system comprises an onboard sensor that a vehicle has on the front side. The onboard sensor measures inter-vehicular distances between a trailing vehicle (or one's own vehicle) and a leading vehicle, or relative speeds of the trailing vehicle's speeds to the leading vehicle's speeds. Based on the resulting information, the auto-cruising system controls the throttle or brake of one's own vehicle in order to accelerate or decelerate one's own vehicle, thereby controlling the inter-vehicular distances. As an onboard sensor that is employed for auto-cruising system, laser radars, or millimeter-electromagnetic-wave radars have been used commonly. A millimeter-electromagnetic-wave radar transmits a millimeter electromagnetic wave, and then receives the millimeter electromagnetic wave that has collided with and has reflected from an object. Thus, the millimeter-electromagnetic-wave radar measures inter-vehicular distances or relative speeds between a leading vehicle and a trailing vehicle (or one's own vehicle) based on differences between the resultant transmitted electromagnetic wave and received electromagnetic wave. For example, the transmitted millimeter electromagnetic wave exhibits a frequency of from 30 GHz to 300 GHz, and exhibits a wavelength of from 1 mm to 10 mm. Moreover, an electromagnetic-wave transmission cove is disposed in front of the millimeter-electromagnetic-wave radar. That is, the millimeter electromagnetic wave, which the millimeter-electromagnetic-wave radar has irradiated or emitted, is transmitted through the electromagnetic-wave transmission cover, and is then outputted forward ahead of a trailing vehicle (or one's own vehicle).

Figure 16:
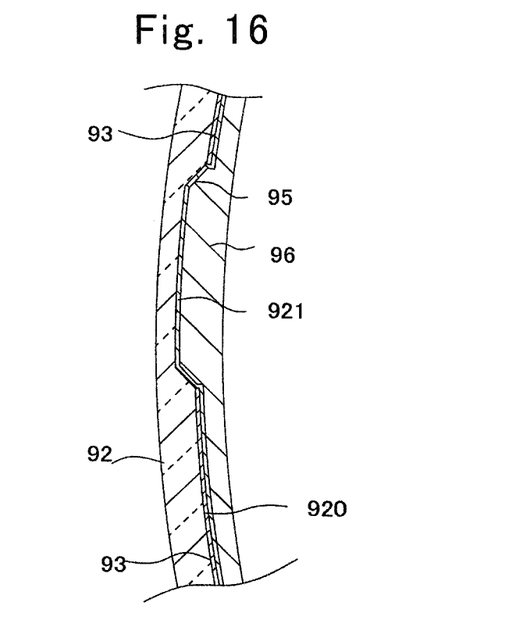
FIG. 16 is a cross-sectional diagram illustrating a millimeter-electromagnetic-wave transmission cover according to a conventional example.

As illustrated in FIG. 16, a conventional electromagnetic-wave transmission cover comprises a transparent base 92, a decorative layer 93, a metallic layer 95, and a base layer 96, for instance. The transparent base 92 covers the decorative layer 93 on the front side. The base layer 96 retains the metallic layer 95 on the rear side. The transparent base 92 is provided with a recessed section 921 and an ordinary section 920 in the rear face. The decorative layer 93 covers the ordinary section 920, that is, sections other than the recessed section 921, while leaving the recessed section 921 uncovered. The metallic layer 95 covers the recessed section 921 in the rear face of the transparent base 92. When the conventional electromagnetic-wave transmission cover is viewed on the front side, the metallic layer 95 formed on the recessed section 921 appears through the transparent base 92 as if it stands out up forward (or as if it is embossed therein in relief). The decorative layer 93 appears down below in the ordinary section 920 around the recessed section 921 of the transparent base 92.

Figure 17:
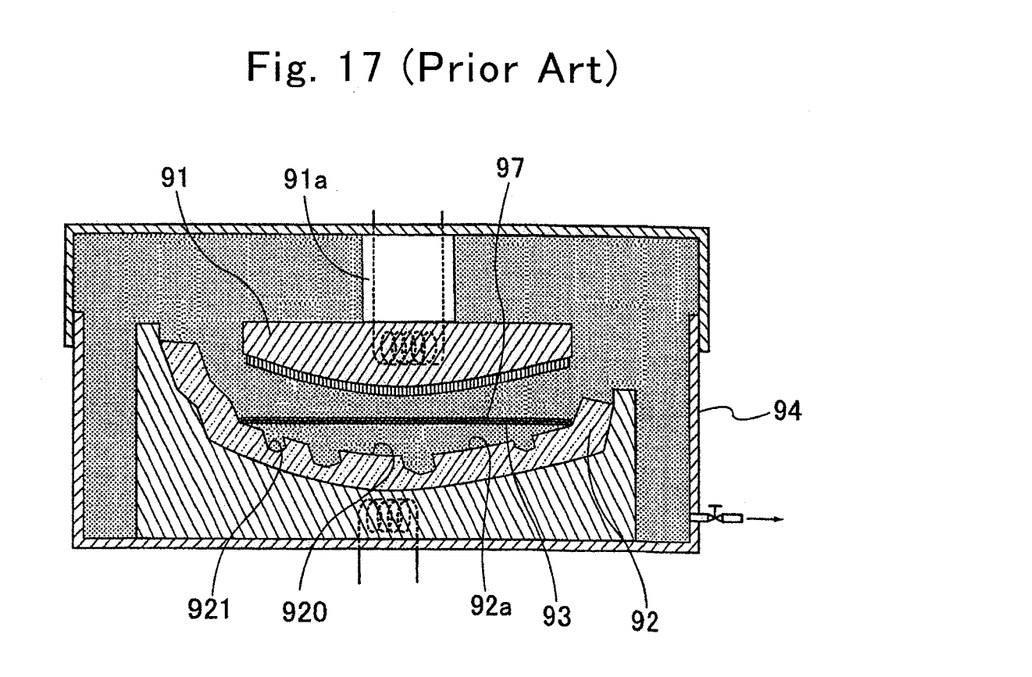
FIG. 17 is a cross-sectional explanatory diagram illustrating a step in a manufacturing process for the millimeter-electromagnetic-wave transmission cover according to the conventional example.
Figure 18:
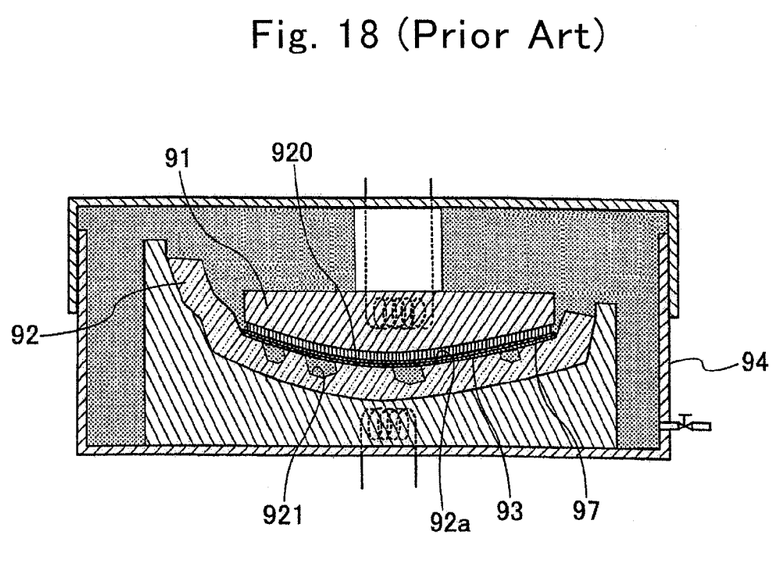
FIG. 18 is a cross-sectional explanatory diagram illustrating an other step, which follows the step illustrated in FIG. 17, in the manufacturing process for the millimeter-electromagnetic-wave transmission cover according to the conventional example.

As a method for forming such a decorative layer, Japanese Unexamined Patent Publication (KOKAI) Gazette No. 2012-111045 discloses a hot stamping (or pressing) method that has been heretofore available conventionally. In the disclosed method, a stamped foil 97 with a decorative layer 93 provided is pressed onto a transfer face 92a of a transparent base 92 while heating the stamped foil 97 with use of a stamping jig 91 having a built-in heater coil 91a, as shown in FIGS. 17 and 18 accompanied herewith. Note that FIGS. 17 and 18 correspond to FIGS. 4(b) and (c) in Japanese Unexamined Patent Publication (KOKAI) Gazette No. 2012-111045. Moreover, the heating/pressing step is carried out after putting all of the stamping jig 91, the transparent base 92 and the stamped foil 97 in a case 94 and then depressurizing the atmosphere within the case 94. After completing the heating/pressing step, the case 94 is opened to put the inner atmosphere back to the atmospheric pressure, and then the stamping jig 91 is separated from the stamped foil 97. Since the stamped foil 97 covers recessed sections 921 in the transparent base 92, the depressurized state prior to opening the case 94 can be kept inside the recessed sections 921. Consequently, the decorative layer 93 comprising the stamped foil 97 can be formed on ordinary sections 920 around the recessed sections 921 in the transparent base 92. After the stamped foil 97 has been taken off from the transparent base 92 except for the decorative layer 93 formed on the ordinary sections 920, the metallic layer 95 is formed on the rear face of the transparent base 92 with which the decorative layer 93 has been provided.

However, the conventional decorative layer 93 formed by the above-described hot stamping method has been associated with room or need for improving the looks, because it appears flat when being viewed through the transparent base 92. Moreover, not only conventional electromagnetic-wave transmission covers, but also conventional emblems having the same construction as that of the conventional electromagnetic-wave transmission covers have also been associated with room or need for improving the looks when the conventional emblems are provided with a decorative layer by the hot stamping method.

SUMMARY OF THE INVENTION

The present invention has been developed in view of the above-described circumstances. It is therefore an object of the present invention to provide a decorative member for vehicle, decorative member which has better looks.

For example, a decorative member for vehicle is curved as a forward-bulging shape, and comprises:

a transparent base made from a resinous material, and including a front face and a rear face, the rear face having an ordinary section and a recessed section dented more forward than is the ordinary section;

a transferred layer;

a metallic layer;

a base layer;

the transferred layer, the metallic layer and the base layer disposed in this order on a rear-face side of the transparent base;

the transferred layer formed on the ordinary section in the rear face of transparent base;

the metallic layer formed on the ordinary section of the transparent base on which the transferred layer is formed, and on the recessed section in the rear face of the transparent base; and the transferred layer formed by: pressing a transfer sheet, which comprises a support film, a release layer formed on the support film, a decorative layer formed on the release layer and an adhesive layer formed on the decorative layer, onto the ordinary section in the rear face of the transparent base while heating the transfer sheet; fixing the decorative player and the release layer onto the ordinary section by the adhesive layer; and then removing the support film from the release layer.

The thus constructed decorative member for vehicle according to the present invention comprises the transparent base whose rear face is provided with the recessed section dented forward and the ordinary section other than the recessed section. The present vehicular decorative member is made using a transfer sheet. For example, the transfer sheet comprises the release layer, the decorative layer and the adhesive layer that are formed one after another on the support film in this order. The support film is removed after pressing the transfer sheet onto the ordinary section as it is heated to fix the adhesive layer, decorative layer and release layer onto the ordinary section. The method can also be referred to as a hot stamping (or pressing) method. In accordance with the present hot stamping method, the transferred layer, which comprises the adhesive layer, the decorative layer and the release layer, is formed on the ordinary section. Thereafter, the metallic layer is formed on the entire rear face of the transparent base involving the ordinary section on which the transferred layer is formed. When the thus constructed present vehicular decorative member is viewed on the front side, the present vehicular decorative member exhibits upgraded or enhanced decorativeness, because the metallic layer's metallic gloss is added to the decorative layer to be visible therein.

Reasoning how the advantage is effected will be hereinafter described. When an incoming light falls or strikes on the transparent base, many of the components are reflected at the decorative layer so that the decorative layer's color becomes visible to human eyes. Moreover, some of the incoming light components, which have fallen or struck on the decorative layer, transmit through the decorative layer, reach the metallic layer by way of the release layer disposed more rearward, and then reflect at the metallic layer. Thus, the some of the incoming light components also fail or strike on human eyes eventually. Consequently, the metallic layer's metallic gloss is added to the decorative layer to be visible therein. In particular, the decorative member for vehicle according to the present invention comprises the decorative layer that is formed by the above-described not stamping method. Moreover, the decorative layer formed by the hot stamping method is provided with the release layer on the surface. Since the release layer's surface abuts on the support film, the surface is flat and smooth relatively. When the release layer is provided with the metallic layer on the flat and smooth surface, the metallic layer also becomes flat and smooth on the surface that makes contact with the release layer's flat and smooth surface on which the metallic layer is disposed.

As a result, an incoming light falling or striking on the metallic layer is scattered less at the interface between the metallic layer and the release layer, and is then reflected at the metallic layer. Consequently, the resulting reflected light coming from the metallic layer becomes likely to enter an observer's eyes even when it comes through the release layer, the decorative layer and the transparent base. Moreover, since the decorative layer's own colors are coupled with the metallic gloss of the metallic layer that is disposed on a rear-face side of the decorative layer, the decorative layer is visible in colors in which the metallic layer's metallic gloss is added to the decorative layer's own colors combinedly. In addition, since the release layer intervenes between the decorative layer and the metallic layer, the release layer adds deepness or profoundness to the metallic gross that the metallic layer emits. Hence, the present invention makes it possible to provide decorative members for vehicle that excel in terms of the decorativeness.

In the decorative member for vehicle according to the present invention, it is preferable that the metallic layer can have a face exhibiting a surface roughness "Ra" of 0.3 µm or less that faces to the transferred layer. If such is the case, the metallic layer is upgraded in flatness and smoothness on one of the opposite surfaces. Accordingly, it is possible to inhibit reflected lights that the flat and smooth metallic layer emits from being scattered at the interface between the release layer and the metallic layer effectively. Consequently, it is possible to securely impart the decorative layer the metallic layer's metallic gross that has been deepened profoundly.

In the decorative layer for vehicle according to the present invention, it is preferable that the transfer sheet can include the release layer exhibiting transparency. Since the release layer intervening the decorative layer and the metallic layer is transparent, the metallic gross emitted by the metallic layer becomes likely to fall or strike on the decorative layer. Thus, it is possible to impart the metallic layer's metallic gross made deeper profoundly to the decorative layer securely. Note herein that the term, "transparency," herein means to involve being of colorless transparency, and being of colored transparency. The release layer can exhibit such an extent of transparency that the metallic layer disposed on the other side is visible through the release layer.

In the decorative member for vehicle according to the present invention, it is preferable that the transfer sheet can include the decorative layer formed by gravure printing. Many of inks used for gravure printing exhibit a lower viscosity, respectively. As a result, it is possible to provide the decorative layer with a flat and smooth surface. Accordingly, the release layer formed on the decorative layer's flat and smooth surface is upgraded in the superficial flatness and smoothness. Thus, a lower roughness is exhibited by the interface between the metallic layer and the resulting flat and smooth surface of the release layer. Consequently, it is possible to prevent reflected lights that the metallic layer emits from being scattered at the interface. Therefore, it is possible to securely impart the decorative layer the metallic layer's metallic gross that has been deepened profoundly.

In the decorative member for vehicle according to the present invention, it is preferable that the transparent base can further include a perpendicular face extending perpendicularly to the ordinary section, and surrounding a peripheral rim of the ordinary section in the rear face. In this instance, the interface (or an appearance separation or distinction line) between the decorative layer and the metallic layer can be disposed at the boundary line between the ordinary section and the recessed section. Accordingly, the metallic layer formed on the ordinary section becomes invisible. Consequently, the present vehicular decorative member is upgraded in terms of the decorativeness.

Moreover, it is preferable that the decorative member for vehicle according to the present invention can comprise the metallic layer that is formed by vapor deposition or sputtering. If so, the present vehicular decorative member is provided with the metallic layer that is formed flatly and smoothly.

In addition, it is preferable that the decorative member for vehicle according to the present invention can make an electromagnetic-wave transmission cover. If so, it is possible for the resulting electromagnetic-wave transmission cover to have better looks.

Since the decorative member for vehicle according to the present invention comprises the transparent base that is provided, with the decorative layer and release layer on the ordinary section in the rear face, the present vehicular decorative member enables manufacturers to provide vehicular decorative members that have better looks.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

A decorative member for vehicle, which is directed to an embodiment mode according to the present invention, comprises a transparent base, a transferred layer, a metallic layer, and a base layer. The transparent base has a front face, and a rear face. The transferred layer, the metallic layer, and the base layer are disposed in this order on the transparent base's rear-face side.

The transparent base exhibits transparency, and is made from a resinous material. The term, "transparent," involves not only when the transparent base is fully transparent but also when it is semi-transparent. The term also involves cases where the transparent base is transparent to such an extent that the decorative layer, which is formed on a side of the transparent base's rear face, is visible clearly or blurredly when a decorative member for vehicle according to the present embodiment mode is viewed on the transparent base's front face. The transparent base can be colorlessly transparent as well as chromatically transparent.

As a transparent material making up the transparent base, it is possible, for example, to use one or more members that are selected from the group consisting of polycarbonate (or PC) resins and acrylic resins. The acrylic resins can be poly(acrylic acid) (or PAA) resins, poly(methacrylate) (or PMA) resins, and poly(methyl methacrylate) (or PMMA) resins, for instance. From the viewpoint of cost, an acrylic resin can be a preferred option. From the viewpoint of moldability, a polycarbonate resin can be a preferred option, because it is so soft that damages are less likely to occur in the resulting products at the time of demolding, namely, removing them from a mold or die.

The transparent base has a front face, and a rear face. The transparent base is formed as a thin-plated configuration substantially, and is curved gently in such a direction as it protrudes forward. The transparent base is disposed on a front side in a decorative member for vehicle according to the present embodiment mode. The transparent base is provided with an ordinary section and a recessed section in the rear face. The recessed section is dented more forward than the ordinary section is. A transferred layer is formed on the ordinary section in the transparent base's rear face. The transferred layer comprises an adhesive layer, a decorative layer, and a release layer. When a vehicular decorative member according to the present embodiment mode is viewed on the front side, the transferred layer's decorative layer is visible under the ordinary section in the transparent base.

Moreover, a metallic layer is formed on the recessed section in the transparent base's rear face, and on the ordinary section therein on which the transferred layer is formed. When a vehicular decorative member according to the present embodiment mode is viewed on the front side, the metallic layer formed on the recessed section is visible so as to stand out (or be embossed) more forward than is the decorative layer formed on the ordinary section. Thus, a decorative design formed of the decorative layer and metallic layer is visible three-dimensionally.

The transferred layer can be formed using a hot stamping method. When using a transfer method, one of the hot stamping methods, to form the transferred layer, a transfer sheet is used. For example, the transfer sheet comprises a support film, a release layer, the decorative layer, and an adhesive layer. The release layer is formed on the support film. The decorative layer is formed on the release layer. The adhesive layer is formed on the decorative layer.

The support film can be made from polyethylene terephthalate (or PET), for instance. The release layer can be made from a release agent. It is preferable that one of the components of the release agent can comprise an acrylic resin, for instance. The adhesive layer can be made from a thermoplastic adhesive, for instance.

It is preferable that the decorative layer can be formed by a printing method. In particular, it is more preferable that the decorative layer can be formed by a gravure printing method. The term, "gravure printing," indicates one of the printing methods that carry out printing with use of a rotary printing machine. Since gravure printing is a printing method that employs a rotary printing machine, it is suitable for forming the decorative layer onto the support film continuously.

The printing machine used for gravure printing comprises a cylinder that is provided with a gravure plate or impression on the surface. The cylinder is rotated to print the decorative layer onto the support film with an ink while immersing the cylinder's gravure plate or impression partially into a container that holds the liquid ink therein. When forming the decorative layer made up of multiple colors, the support film is put into the printing machine for each of the colors to print the decorative layer with a multicolored pattern on the support film.

The ink used in the gravure printing method can preferably exhibit a viscosity of from 0.2 to 2 dPa·s at room temperature. On this occasion, it is possible for such an ink to form the decorative layer whose surface is smooth and flat while printing the decorative layer on the support film by way of the release layer securely with the adhered link. Note that it is more preferable that the viscosity can fail in a range of from 0.9 to 1.1 dPa·s at room temperature.

Not only when the decorative layer is formed by the gravure printing method, but also when the decorative layer is formed by the other methods, the decorative layer can preferably exhibit a surface roughness "Ra" that falls in a range of from 0.01 to 0.3 μm. If such is the case, it is possible to make flatter the interface between the release layer formed on the decorative layer's surface and the metallic layer formed on the release layer's surface. Accordingly, it is possible to securely prevent incoming lights falling or striking on the metallic layer from reflecting irregularly at the interface between the release layer and the metallic layer. Consequently, it is possible to securely impart the decorative layer the metallic layer's metallic gross that has been deepened profoundly. Note that it is more preferable chat the surface roughness "Ra" can fall in a range of from 0.03 to 0.07 μm. Moreover, the surface roughness "Ra" is also referred to as a "calculated average roughness," and can be calculated as follows: sampling a predetermined reference length from out of a roughness curve in the average line's direction; calculating a sum of the absolute values of deviations from the average line to a measured curve over the sampled length; and averaging the absolute values of the deviations. For example, Japanese Industrial Standard (JIS) B0601 prescribes the surface roughness "Ra."

After the transfer sheet is completed by forming the release layer, the decorative layer and the adhesive layer one after another on one of the opposite surfaces of the support film, the resulting transfer sheet is pressed onto the transparent base's ordinary section as it is heated. On this occasion, it is allowable to use a hot stamping apparatus. Moreover, it is permissible to put a space between the transparent base's rear face and the transfer sheet in a depressurized environment when heating the transfer sheet and pressing the transfer sheet onto the ordinary section in the transparent base's rear face. The transparent base takes on a convexed shape protruding forward on the front face, and takes on a concaved shape on the rear face. In order to cover the transparent base's rear face curving as a concaved shape with the transfer sheet, it is preferable to set at least an air pressure within the space between the transparent base's rear face and the transfer sheet at a low pressure that is lower than another air pressure in the ambient environment.

When the transfer sheet is pressed onto the transparent base's ordinary section by a hot stamping apparatus as it is heated, the transfer sheet's adhesive layer fixes the transfer sheet's decorative layer, together with the release layer, onto the ordinary section. When pulling up the hot stamping apparatus and then taking the transfer sheet's support film off from the release layer, the adhesive layer, the decorative layer and the release layer stay on the transparent base's ordinary section.

Thereafter, the metallic layer is formed onto the transparent base's rear face. The metallic layer makes contact with the transfer sheet's release layer directly. The metallic layer can preferably be formed by vapor deposition or sputtering. If so, it is possible to form the metallic layer one of whose opposite surfaces is flat and smooth. It is preferable to form the metallic layer using a metal that can transmit millimeter electromagnetic waves. As for such a metal, it is possible to name indium, for instance.

When using a decorative member for vehicle according to the present embodiment mode as an electromagnetic-wave transmission cover, the adhesive layer, the decorative layer, the release layer, and the metallic layer can preferably be composed of a material that is able to transmit electromagnetic waves. The decorative layer can preferably be composed of an electromagnetic-wave transmissive paint. The metallic layer can be composed of indium, for instance. Since indium is likely to transmit electromagnetic waves such as millimeter electromagnetic wave, it can be used suitably as the metallic layer.

Under the ordinary section in the transparent base's rear face, the metallic layer makes contact with the release layer that is disposed on the decorative layer in the transferred layer. Accordingly, the metallic layer can have a flat and smooth surface especially at some of the parts that make contact with the release layer's surface. It is preferable that metallic layer can exhibit a surface roughness "Ra" falling in a range of from 0.01 to 0.3 µm at some of the parts that make contact with the release layer's surface. As a result, incoming lights falling or striking on the metallic layer can be prevented securely from reflecting irregularly at the interface between the release layer and the metallic layer. Therefore, the metallic layer's metallic gross that has been deepened profoundly can be imparted securely to the decorative layer.

The release layer can preferably exhibit a surface roughness failing in a range of from 0.01 to 0.3 µm at some of the parts that face to the metallic layer. On this occasion, it is possible to provide one of the opposite surfaces of the release layer with the metallic layer that has a flat smooth surface. Accordingly, it is possible to securely prevent incoming lights falling or striking on the metallic layer from reflecting irregularly at the interface between the release layer and the metallic layer. Consequently, it is possible to securely impart the decorative layer the metallic layer's metallic gross that has been deepened profoundly.

The metallic layer is covered with the base layer on one of the opposite surfaces. The base layer enhances a decorative member for vehicle according to the present embodiment mode in terms of strength. The base layer can either be colored or colorless. The base layer can be made using a resinous material, such as acrylonitrile-ethylene-styrene (or AES) copolymer resins and acrylonitrile-butadiene-styrene (or ABS) copolymer resins, for instance. Of these, an AES copolymer resin can be a preferred option, because it exhibits a shrinkage ratio and specific inductive capacity that approximate those of polycarbonate (or PC).

It is preferable that a decorative member for vehicle according to the present embodiment mode can make an electromagnetic-wave transmission cover that is disposed in front of a millimeter-electromagnetic-wave radar. The present vehicular decorative member serving as an electromagnetic-wave transmission cover can have a predetermined thickness in order to suppress an attenuating or damping magnitude of millimeter electromagnetic waves when they transmit through the resulting electromagnetic-wave transmission cover. That is, since the resultant electromagnetic-wave transmission cover comprises the transparent base, the adhesive layer, the decorative layer and the release layer, these constituent elements can preferably have a thickness as a whole that is set up at a predetermined thickness. In order for causing the resulting electromagnetic-wave transmission cover to output a millimeter electromagnetic wave without ever attenuating or damping the millimeter electromagnetic wave, the electromagnetic-wave transmission cover can preferably have an overall thickness that is an integral multiple of a half of the millimeter electromagnetic wave's wavelength $\lambda$ when the millimeter electromagnetic wave transmits through the electromagnetic-wave transmission cover.

A decorative member for vehicle according to the present embodiment mode can even make front grills, back panels, emblems, and so on, as well.

Embodiment

Figure 1:
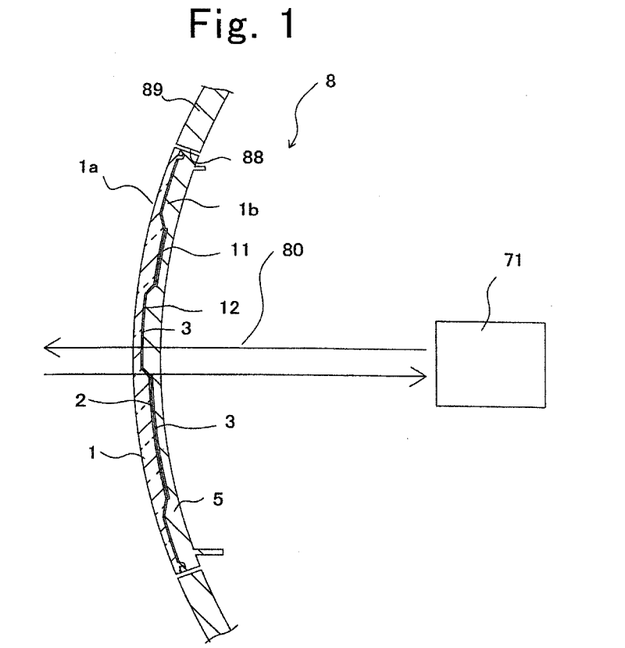
FIG. 1 is a cross-sectional diagram illustrating a millimeter-electromagnetic-wave transmission cover according to an Embodiment of the present invention.

As illustrated in FIG. 1, a decorative member for vehicle according to an Embodiment of the present invention made a millimeter-electromagnetic-wave transmission cover 8 that was used for auto-cruising system. The millimeter-electromagnetic-wave transmission cover 8 was installed to the peripheral rim of an installation hole 88 with which a front grille 89 for vehicle was provided at the central part. A millimeter-electromagnetic-wave radar 71 was disposed on a rear side of the millimeter-electromagnetic-wave transmission cover 8. The millimeter-electromagnetic-wave radar 71 sent out a millimeter electromagnetic wave 80 toward the front side. The millimeter electromagnetic wave 80 was transmitted through the millimeter-electromagnetic-wave transmission cover 8, and was then reflected at an obstacle in front of a vehicle. The reflected millimeter electromagnetic wave was passed back through the millimeter-electromagnetic-wave transmission cover 8, and was then received by the millimeter-electromagnetic-wave radar 71. The auto-cruising system's onboard sensor calculated inter-vehicular distances between a trailing vehicle (or one's own vehicle) and a leading vehicle, or relative speeds of the trailing vehicle's speeds to the leading vehicle's speeds, from differences between the sent-out wave of the millimeter electromagnetic wave 80 and the received wave. The millimeter-electromagnetic-wave transmission cover 8 was curved as an arc shape that protruded forward in a convexed manner. The electromagnetic-wave transmission cover 8 needed to output the millimeter-electromagnetic wave 80, which the millimeter-electromagnetic-wave radar 71 outputted, to the outside at a uniform output power and with a minimized propagation loss. Consequently, the millimeter-electromagnetic-wave transmission cover 8 had a predetermined thickness that was determined in relation to a wavelength $\lambda$ of the millimeter electromagnetic wave 80.

Figure 2:
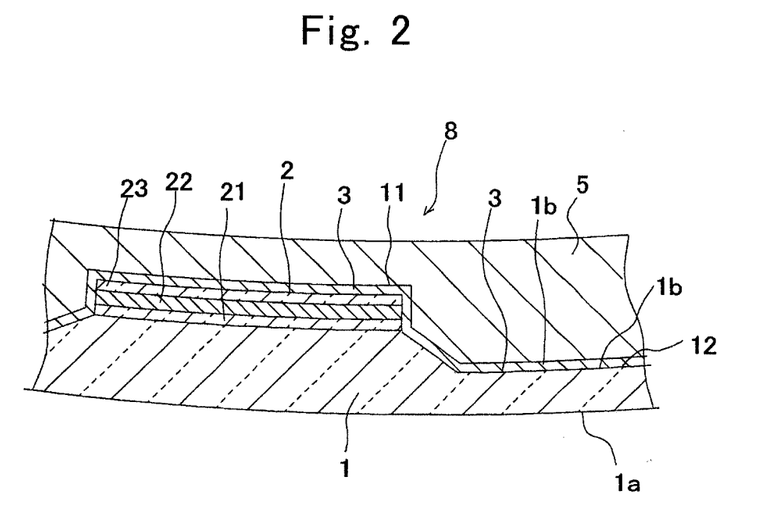
FIG. 2 is an enlarged cross-sectional diagram illustrating the present millimeter-electromagnetic-wave transmission cover according to the Embodiment.

As illustrated in FIG. 2, the millimeter-electromagnetic-wave transmission cover 8 comprised a transparent base 1, a transferred layer 2, a metallic layer 3, and a base layer 5. The transparent base 1 had a front face 1a, and a rear face 1b. The transferred layer 2, the metallic layer 3, and the base layer 5 were disposed one after another in this order on the side of the rear face 1b of the transparent base 1.

The transparent base 1 was transparent colorlessly, and was made from a polycarbonate resin. The transparent base 1 had a thin-plated configuration that was provided with the front face 1a and rear face 1b, and curved forward gently in a convexed manner. The front face 1a of the transparent base 1 took on a flatly-smoothed face. The rear face 1b of the transparent base 1 included ordinary sections 11, and recessed sections 12. The ordinary sections 11 were provided with a flat and smooth surface. The recessed sections 12 dented down below the ordinary sections 11. Moreover, the recessed sections 12 were formed so as to take the shape of a mark 30, such as letters. The recessed sections 12 had a depth of 2.3 mm. The transparent base 1 had a thickness of 5.3 mm that extended between the front face 1a and the ordinary sections 11 in the rear face 1b.

The transparent base 1 was provided with the transferred layer 2 on the ordinary sections 11 in the rear face 1b. The transferred layer 2 comprised an adhesive layer 21, a decorative layer 22, and a release layer 23. The adhesive layer 21 and release layer 23 were transparent colorlessly. The decorative layer 22 formed a two-colored chromatic pattern. The adhesive layer 21 had a thickness of 1 µm. The decorative layer 22 had a thickness of 1 µm. The release layer 23 had a thickness of 1 µm. Moreover, the decorative layer 22 exhibited a surface roughness "Ra" that was 0.05 µm. The release layer 23 exhibited a surface roughness "Ra" that was 0.05 µm. When the millimeter-electromagnetic-wave transmission cover 8 was viewed on the front side, the decorative layer 22 of the transferred layer 2 was visible under the ordinary sections 11 in the transparent base 1.

Figure 3:
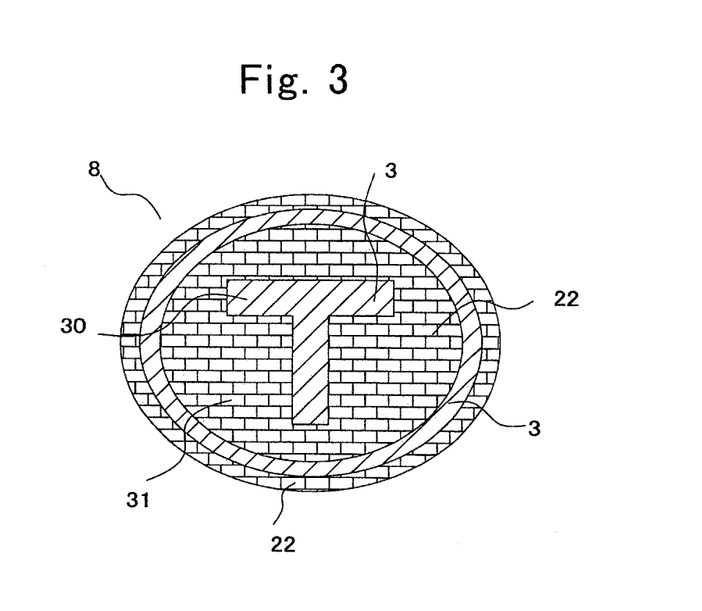
FIG. 3 is a plan-view diagram illustrating the present millimeter-electromagnetic-wave transmission cover according to the Embodiment.

Moreover, the recessed sections 12 in the rear face 1b of the transparent base 1, and the ordinary sections 11 on which the transferred layer 2 was formed were provided with the metallic layer 3. In addition, the metallic layer 3 was formed so as to take the shape of the mark 30 within the recessed sections 12. As illustrated in FIG. 3, the metallic layer 3 was visible to stand out more forward than was the decorative layer 22 formed on the ordinary sections 11 when the millimeter-electromagnetic-wave transmission cover 8 was viewed on the front side. The decorative layer 22 formed on the ordinary sections 11 was visible as a background 31 to the mark 30. Thus, a viewer could see the resulting decorative design formed of the decorative layer 22 and metallic layer 3 three-dimensionally.

The base layer 5 was made from an acrylonitrile-ethylene-styrene (or AES) copolymer resin.

Figure 4:
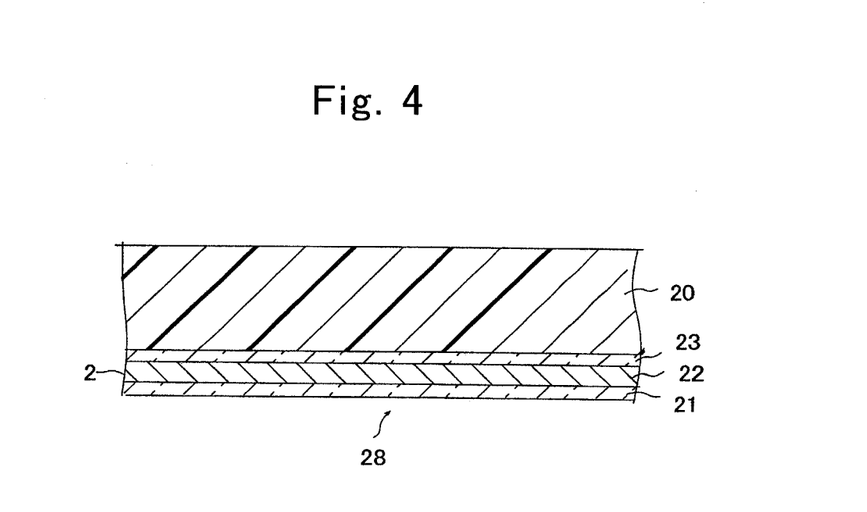
FIG. 4 is a cross-sectional diagram illustrating a transfer sheet that was used for manufacturing the present millimeter-electromagnetic-wave transmission cover according to the Embodiment.
Figure 5:
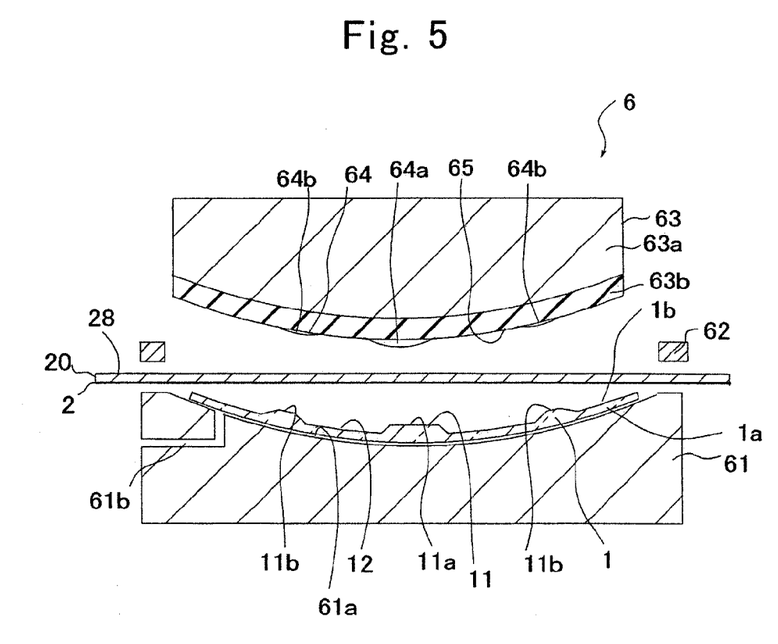
FIG. 5 is a cross-sectional diagram illustrating a hot stamping apparatus that was used for manufacturing the present millimeter-electromagnetic-wave transmission cover according to the Embodiment.

In order to manufacture the millimeter-electromagnetic-wave transmission cover 8, the transparent base 1 was made by injection molding. Then, the resulting transparent base 1 was provided with the transferred layer 2 on the rear face 1b. The transferred layer 2 was made by a later-described transfer method with use of a hot stamping apparatus 6. As illustrated in FIGS. 4 and 5, a transfer sheet 28, and the hot stamping apparatus 6 were employed in the transfer method. The transfer sheet 28 comprised a support film 20, the release layer 23, the decorative layer 22, and the adhesive layer 21, as shown in FIG. 4. The release layer 23 was formed on the support film 20. The decorative layer 22 was formed on the release layer 23. The adhesive layer 21 was formed on the decorative layer 22.

The support film 20 was made from polyethylene terephthalate (or PET), and had a thickness of 25 µm. The adhesive layer 21 was made from a thermoplastic adhesive. The decorative layer 22 was made from an electromagnetic-wave transmissive paint. The release layer 23 was made from a release agent. Note that a specific component of the release agent comprised an acrylic resin. The adhesive layer 21, the decorative layer 22, and the release layer 23 had a thickness of 1 µm, respectively.

The decorative layer 22 was formed in a blue color by a gravure printing method. In the gravure printing method, a plate or impression, whose parts, such as letters or patterns to be printed, were dented contrary to those bulged in relief or letterpress printing, was used. For example, in the gravure printing method, an ink was applied to the plate or impression entirely, and the ink in excess was wiped off from the plate or impression's surface to scrape off the excessive ink therefrom by a doctor blade. Thus, only the ink held in the plate or impression's depressions was left behind on the plate or impression. Then, the leftover ink was pressed onto the release layer 23 formed on the support film 20 to transfer. For light-colored parts in the decorative layer 22, the depressions were made shallower in the plate or impression, whereas the depressions were made deeper in the plate or impression for deep-colored parts in the decorative layer 22. Such gravure printing made it possible to express elaborate gradation patterns. The ink employed in the gravure printing method usually exhibited a viscosity of 1 dPa·s at room temperature. Since the decorative layer 22 was made up of two colors, it was printed for each of the two colors by the gravure printing method.

As illustrated in FIG. 5, the hot stamping apparatus 6 comprised a fixation jig 61, a clamp 62, and a pressurizer 63. The fixation jig 61 in eluded a work place meat section 61a at the top, and a vacuum suctioning hole 61b. The transparent base 1 was placed on the work placement section 61a. The vacuum suctioning hole 61b was formed inside the work placement section 61a. The work placement section 61a was formed as a configuration that conformed to the sidewise configuration of the front face 1a in the transparent base 1. The vacuum suctioning hole 61b was opened relatively adjacent to the peripheral rim of the work placement section 61a. The clamp 62 was formed as a framed body that surrounded the outer peripheral rim of the work placement section 61a with which the fixation jig 61 was provided at the top. The pressurizer 63 included a pressurizing unit 63a at the bottom, a rubber elastic body 63b, and a not-shown heating unit. The pressurizing unit 63a had a configuration that conformed to the sidewise configuration of the rear face 1b in the transparent base 1. The rubber elastic body 63b covered the pressurizing unit 63a. The heating unit heated the rubber elastic body 63b. Note that the heating unit comprised a hot-wire heater specifically. The rubber elastic body 63b was made from silicone. The heating unit heated the rubber elastic body 63b to 180-210° C., for instance.

The rubber elastic body 63b included a flattened section 65, and protruded sections 64. The protruded sections 64 protruded downward from the flattened section 65. The rubber elastic body 63b had a thickness of 2 mm at the flattened section 65. The protruded sections 64 were formed in a quantity that equals to the number of the ordinary sections 11 formed in the rear face 1b of the transparent base 1. A protrusion magnitude of the protruded sections 64 from the flattened section 65 depended on a size of the ordinary sections 11 in the rear face 1b of the transparent base 1. The ordinary sections 11 might possibly be formed in a quantity of multiple pieces that have various sizes and plain-faced configurations. Consequently, the protrusion magnitude of the protruded section 64a coming into contact with the ordinary section 11a with a wider area was set to be larger, whereas the protrusion magnitude of the protruded sections 64b coming into contact with the ordinary sections 11b with a smaller area was set to be smaller. For example, the protrusion magnitude of the protruded sections 64 was made higher or lower in a range of from 0.2 to 0.3 mm depending on whether the ordinary sections 11 were larger or smaller.

Figure 6:
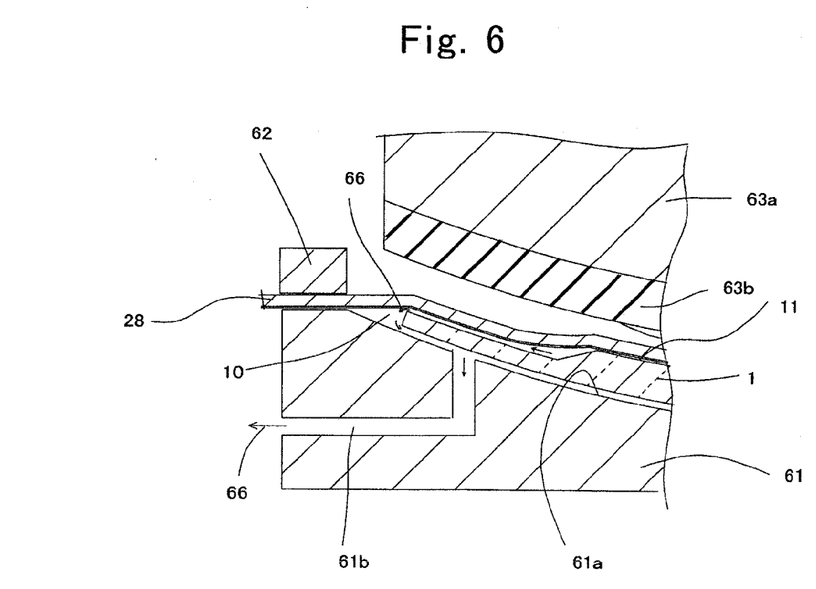
FIG. 6 is an enlarged cross-sectional explanatory diagram illustrating how to depressurize between a transparent base and the transfer sheet in the manufacture of the present millimeter-electromagnetic-wave transmission cover according to Embodiment.

First of all, the transparent base 1 was placed on the work placement section 61a of the fixation jig 61. The transfer sheet 28 was then placed on the transparent base 1. As illustrated in FIG. 6, the transfer sheet 28 was held between the work placement section 61a of the fixation jig 61 and the clamp 62 in such a state that it was being stretched laterally. On this occasion, the transparent base 1 was provided with an enclosed space 10 between itself and the transfer sheet 28 on the side of the rear face 1b.

Figure 7:
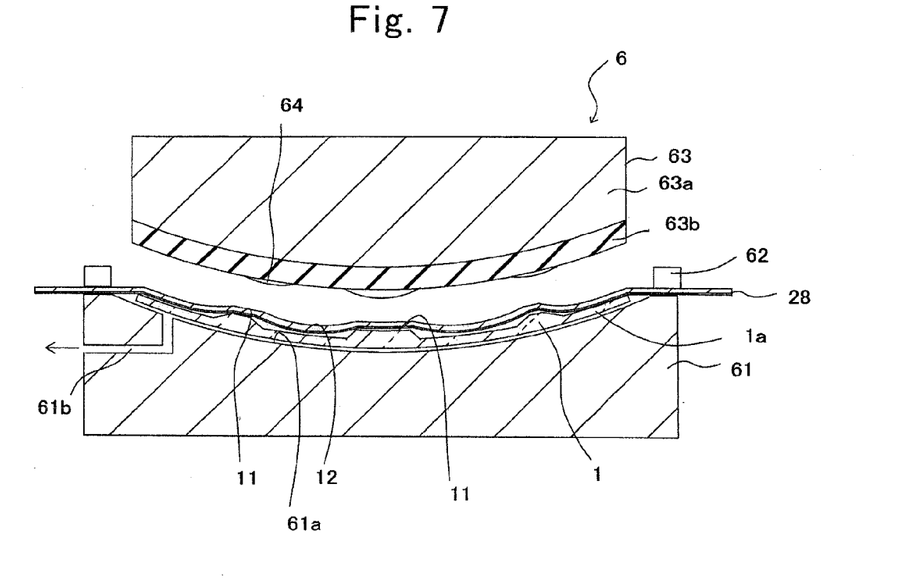
FIG. 7 is a cross-sectional explanatory diagram illustrating the hot stamping apparatus when depressurizing between the transparent base and the transfer sheet in the manufacture of the present millimeter-electromagnetic-wave transmission cover according to the Embodiment.

As illustrated in FIGS. 6 and 7, the enclosed space 10 between the transfer sheet 28 and the rear face 1b of the transparent base 1 was depressurized through the vacuum suctioning hole 61b. Air 66 within the enclosed space 10 was suctioned through the vacuum suctioning hole 61b by way of a clearance between the work placement section 61a of the fixation jig 61 and the front face 1a of the transparent base 1 while bypassing around the transparent base 1. As a result, the transfer sheet 28 was sucked down into the enclosed space 10 to follow along the rear face 1b of the transparent base 1.

Figure 8:
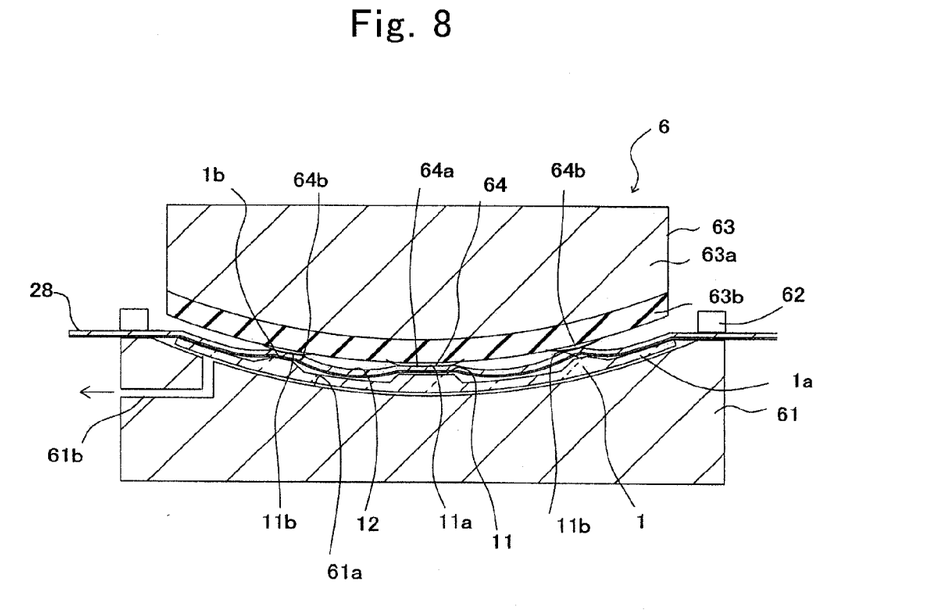
FIG. 8 is a cross-sectional explanatory diagram illustrating the hot stamping apparatus when its pressurizing unit heated the transfer sheet and then pressurized the heated transfer sheet onto the transparent base in the manufacture of the present millimeter-electromagnetic-wave transmission cover according to the Embodiment.

As illustrated in FIG. 8, the pressurizer 63 was descended subsequently so that the pressurizer 63 pressed the transfer sheet 28 onto the rear face 1b of the transparent base 1. A press-in magnitude of the rubber elastic body 63b was set at 1 mm approximately, for instance, after it had come in contact with one of the ordinary sections 11 of the transparent base 1. Firstly, the protruded section 64a, which was disposed in the middle of the pressurizing unit. 63a, pressed the transfer sheet 28 onto the ordinary section 11 that was disposed in the middle of the transparent base 1. Then, the protruded sections 64b, which were disposed adjacent to the peripheral rim of the pressurizing unit 63a, pressed the transfer sheet 26 onto the ordinary sections 11 that were disposed adjacent to the peripheral rim of the transparent base 1. The protruded sections 64 thus underwent compression deformations to let out air 66 from out of the center of the ordinary sections 11 in order to prevent air residuals from forming between the ordinary sections 11 and the transferred layer 2. Note that the air 66 was likely to go out to the surrounding of the ordinary sections 11 because the ordinary section 11a with a wider area came in contact with the protruded section 64a prior to the ordinary sections 11b with a narrower area that came in contact with the protruded sections 64b. Moreover, even when settling or permanent set might possibly occur in the rubber elastic body 63b because it has been used for a long period of time, the rubber elastic body 63b declines less in the transferability than do the other rubber elastic bodies free of the protruded sections 64.

When the transfer sheet 28 was pressed onto the rear face 1b of the transparent base 1 by the pressurizing unit 63a while it was heated, the adhesive layer 21 of the transfer sheet 28 was adhered onto the ordinary sections 11 of the transparent base 1 so that the transfer sheet 28 was fixed onto the ordinary sections 11. Note that, even though the transfer sheet 28 followed along the recessed sections 12, the transfer sheet 28 was neither adhered nor fixed onto the recessed sections 12 in the rear face 1b of the transparent base 1 because the transfer sheet 28 was not in contact with the pressurizer 63 at around the recessed sections 12 so that it was not heated.

Figure 9:
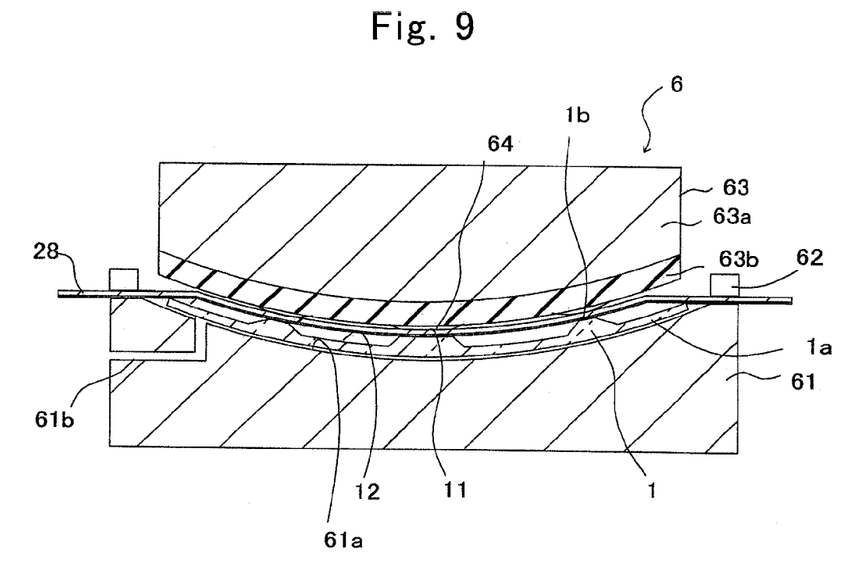
FIG. 9 is a cross-sectional explanatory diagram illustrating the hot stamping apparatus when the depressurized state between the transparent base and the transfer sheet was canceled in the manufacture of the present millimeter-electromagnetic-wave transmission cover according to the Embodiment.

When the suctioning of the air 66 through the vacuum suctioning hole 61b was stopped, the enclosed spaces 10 between the transparent base 1 and the transfer sheet. 28 recovered the atmospheric pressure, as shown in FIG. 9.

Figure 10:
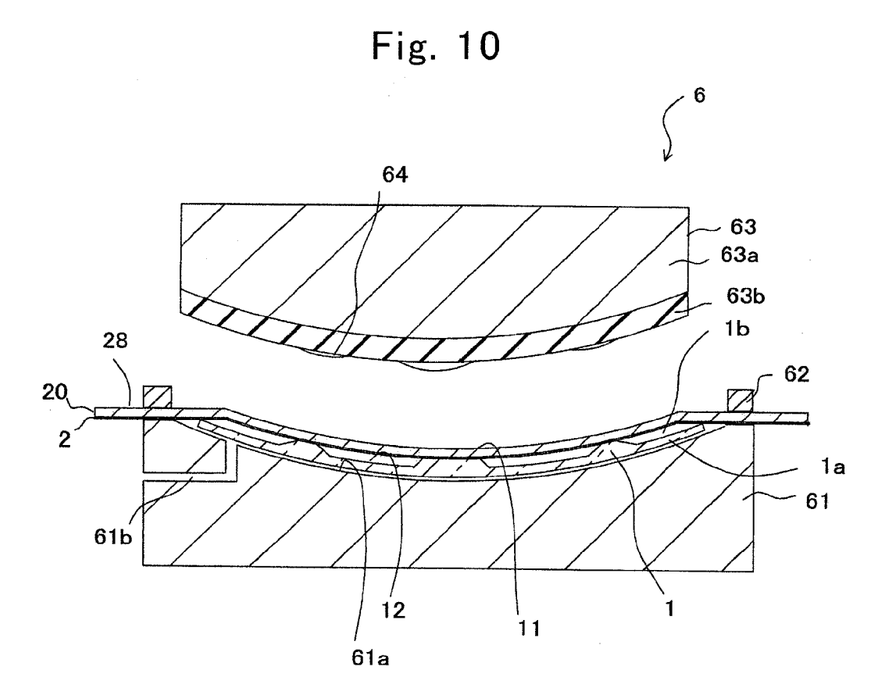
FIG. 10 is a cross-sectional explanatory diagram illustrating the hot stamping apparatus when the pressurizing unit was separated from the transfer sheet in the manufacture of the present millimeter-electromagnetic-wave transmission cover according to the Embodiment.
Figure 11:
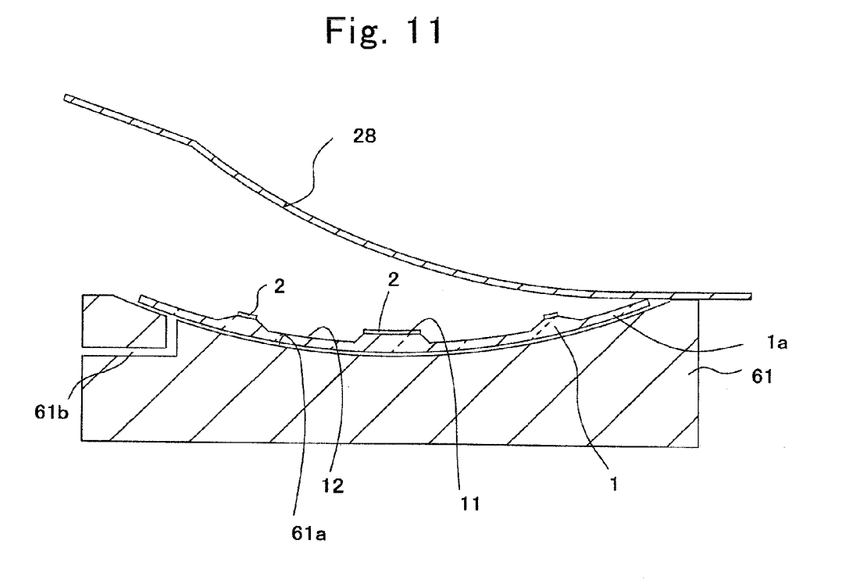
FIG. 11 is a cross-sectional explanatory diagram illustrating the hot stamping apparatus when taking the transfer sheet's support film off from the transfer sheet's release layer in the manufacture of the present millimeter-electromagnetic-wave transmission cover according to the Embodiment.

Then, as illustrated in FIG. 10, the pressurizer 63 was ascended in order to take away the clamp 62. After the transparent base 1 and transfer sheet 28 had been cooled fully, the support film 20 of the transfer sheet 28 was taken off from the release layer 23, as shown in FIG. 11. As a result, the adhesive layer 21, decorative layer 22 and release layer 23 of the transfer sheet 28 were fixed onto the ordinary sections 11 of the transparent base 1 to stay thereon to serve as the transferred layer 2. However, the adhesive layer 21, decorative layer 22 and release layer 23 did not remain on the recessed sections 12 because all of them had been removed together with the support film 20 of the transfer sheet 28.

Figure 12:
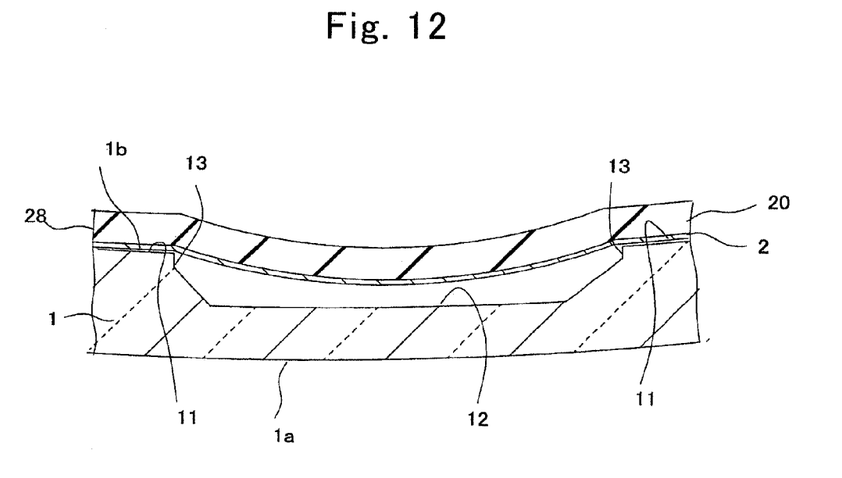
FIG. 12 is an enlarged cross-sectional explanatory diagram illustrating a state of the transparent base and transfer sheet when depressurizing between the transparent base and the transfer sheet in the manufacture of the present millimeter-electromagnetic-wave transmission cover according to the Embodiment in a case where the transparent base's rear face included an ordinary section that was provided with perpendiculars face at the peripheral rim.
Figure 13:
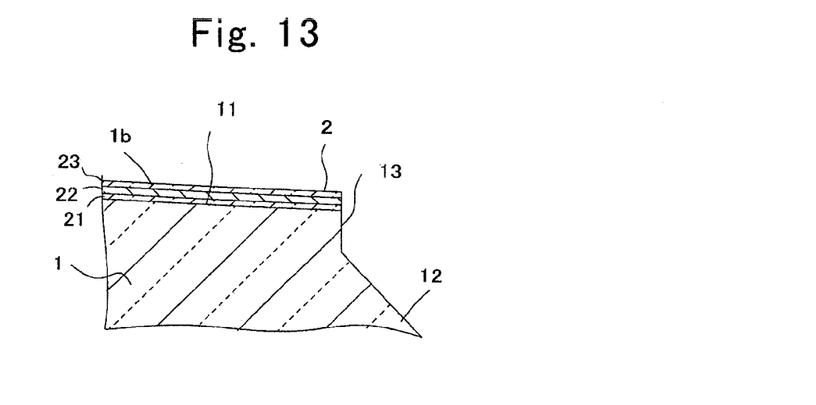
FIG. 13 is an enlarged cross-sectional explanatory diagram illustrating the transparent base adjacent to the perpendicular face in the manufacture of the present millimeter-electromagnetic-wave transmission cover according to the Embodiment when the ordinary section was provided with the perpendicular face at the peripheral rim in the rear face of the transparent base.

Note herein that the peripheral rim of the ordinary sections 11 in the rear face 1b of the transparent base 1 was surrounded by perpendicular faces 13 that extended in the perpendicular direction with respect to the ordinary sections 11, as shown in FIG. 12. The perpendicular faces 13 had a height of from 0.3 to 0.5 mm. The transferred layer 2 was adhered on the ordinary sections 11 up to the top end of the perpendicular faces 13. As a result, the transferred layer 2 (i.e., the adhesive layer 21, decorative layer 22 and release layer 23), which was present over the recessed sections 12 in the rear face 1b of the transparent base 1, was removed together with the support film 20 of the transfer sheet 28, because the transferred layer 2, which was present on the ordinary sections 11, was cut off along the top end of the ordinary sections 11 when the support film 20 of the transfer sheet 28 had been taken off from the release layer 23. An appearance separation or distinction line of the decorative layer 22 in the transferred layer 2 was visible along the boundary line between the ordinary sections 11 and the recessed sections 12, because the remaining transferred layer 2 covered the ordinary sections 11 up to the top end of the perpendicular faces 13 around the ordinary sections 11. Accordingly, the interface between the decorative layer 22 and the metallic layer 3 (or the appearance separation or distinction line of the decorative layer 22) was disposed at the boundary line between the ordinary sections 11 and the recessed sections 12. Consequently, the millimeter-electromagnetic-wave transmission cover 8 according to the Embodiment was upgraded in terms of the decorativeness because the metallic layer 3 formed on the ordinary sections 11 became invisible.

Figure 14:
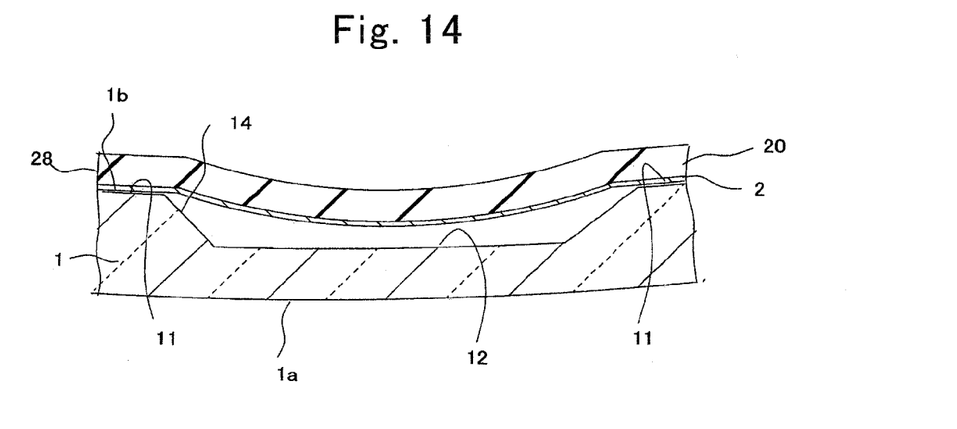
FIG. 14 is an enlarged cross-sectional explanatory diagram illustrating a state of the transparent base and transfer sheet when depressurizing between the transparent base and the transfer sheet in the manufacture of the present millimeter-electromagnetic-wave transmission cover according to the Embodiment in a case where the transparent base's rear face included an ordinary section that was free of the perpendicular faces at the peripheral rim.
Figure 15:
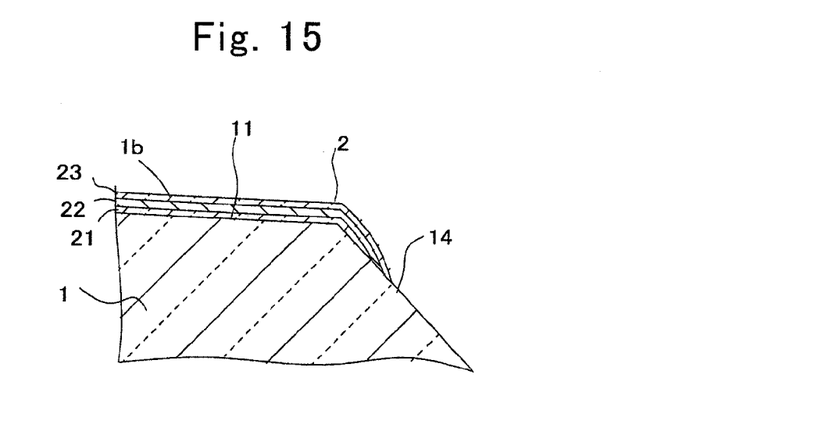
FIG. 15 is an enlarged cross-sectional explanatory diagram illustrating the transparent base adjacent to the ordinary section's peripheral rim in the manufacture of the present millimeter-electromagnetic-wave transmission cover according to the Embodiment when the ordinary portion was not provided with any perpendicular face at the peripheral rim in the rear face of the transparent base.

On other hand, when the peripheral rim of the recessed sections 12 was free from the perpendicular faces 13 but was provided with inclined faces 14 as shown in FIG. 14, the rubber elastic body 63b of the pressurizing unit 63a pressed the transfer sheet 28 onto the inclined faces 14 so that the transferred layer 2 of the transfer sheet 28 had been fixed on the inclined faces 14. Accordingly, the transferred layer 2 including the decorative layer 22 had gone beyond the ordinary sections 11 to be formed on the inclined faces 14 of the recessed sections 12 as well. Consequently, the appearance separation or distinction line of the decorative layer 22 had appeared in the recessed sections 12 so that the resulting millimeter-electromagnetic-wave transmission cover had shown poor looks.

After forming the transferred layer 2, the metallic layer 3 made from indium was formed on the entire rear face 1b of the transparent base 1 by a sputtering method. The metallic layer 3 exhibited a surface roughness "Ra" of 0.1 µm or less on one of the opposite faces that faced to the transferred layer 2. After providing the transparent base 1 with a holder or retainer coating, the transparent base 1 was subjected to insert molding to form the base layer 5 of an acrylonitrile-ethylene-styrene (or AES) resinous material. The millimeter-electromagnetic-wave transmission cover 8 according to the Embodiment was thus manufactured.

The millimeter-electromagnetic-wave transmission cover 8 according to the Embodiment comprised the transparent base 1 that was provided with the recessed sections 12 and the ordinary sections 11 in the rear face 1b. The recessed sections 12 dented forward. The ordinary sections 11 made the rear face 1b other than the recessed sections 12. The ordinary sections 11 were provided with the transferred layer 2 by the hot stamping method. In order to form the transferred layer 2, the transfer sheet 28 was prepared. The resulting transfer sheet 28 was heated, and was then pressurized onto the ordinary sections 11 in the rear face 1b of the transparent base 1. After fixating the adhesive layer 21, the decorative layer 22, the release layer 23 and the support film 20, which made the transfer sheet 28, onto the ordinary sections 11, the support film 20 was taken off from the release layer 23. In accordance with the hot stamping method, the decorative layer 22 was adhered onto the ordinary sections 11 via the adhesive layer 21, and the decorative layer 22 was covered with the release layer 23 on the surface. The ordinary sections 11 were provided with the transferred layer 2 that comprised the adhesive layer 21, the decorative layer 22, and the release layer 23. Thereafter, the metallic layer 3 was formed on the entire rear face 1b of the transparent base 1 involving the ordinary sections 11 on which the transferred layer 2 was formed. When the thus manufactured millimeter-electromagnetic-wave transmission cover 8 was viewed on the front side, it exhibited enhanced decorativeness because the metallic gloss of the metallic layer 3 was added to the decorative layer 22 to be visible therein.

Reasoning will be hereinafter described on how the millimeter-electromagnetic-wave transmission cover 8 according to the Embodiment produces the advantageous effect. Many of the incoming light components falling or striking on the transparent base 1 were reflected at the decorative layer 22 so that the colors of the decorative layer 22 were made visible to human eyes. Some of the incoming light components falling or striking on the decorative layer 22 transmit through the decorative layer 22 to reach the metallic layer 3 through the release layer 23 that was disposed more rearward than was the decorative layer 22. The some of the incoming light components were the reflected at the metallic layer 3 so that they also fell or struck on the human eyes. Consequently, the metallic gloss of the metallic layer 3 was added to the decorative layer 22 to be visible therein. In particular, the millimeter-electromagnetic-wave transmission cover 8 according to the Embodiment comprised the decorative layer 22 that was formed by the hot stamping method as described above. Moreover, the decorative layer 22 formed by the hot stamping method was provided with the release layer 23 on the surface. Since the surface of the release layer 23 had been in contact with the support film 20 in the transfer sheet 28, it was flat and smooth relatively. Since the release layer 23 was provided with the metallic layer 3 had been formed on the surface after the transferred layer 2 on the rear face 1b of the transparent base 1 by the hot stamping method, the metallic layer 3 also became flat and smooth in one of the opposite faces, which came in contact with the release layer 23, on the side of the release layer 3.

The incoming light components, which fell or struck on the metallic layer 3, were less scattered at the interface between the release layer 23 and the metallic layer 3, and were then reflected at the metallic layer 3. Consequently, the reflected light components, which came from the metallic layer 3, became likely to enter an observer's eyes even after they had passed through the release layer 23, the decorative layer 22, the adhesive layer 21, and the transparent base 1. As a result, the decorative layer 22 was visible coupled with the colors and metallic gloss of the metallic layer 3 that was disposed on the rear face of the decorative layer 22 by way of the release layer 23, that is, the decorative layer 22 showed not only its own colors but also the colors to which the colors and metallic gloss of the metallic layer 3 were added. Moreover, since the release layer 23 intervened between the decorative layer 22 and the metallic layer 3, profoundness was given more to the metallic gloss emitted by the metallic layer 3 than it was given when no such release layer 23 was present between them. Therefore, the millimeter-electromagnetic-wave transmission cover 8 according to the Embodiment enabled manufacturers to provide decorative members for vehicle that were made better in terms of the decorativeness.

In addition, the decorative layer 22 was formed by gravure printing. Many of inks having been used commonly in gravure printing exhibit a low viscosity at room temperature. Consequently, such an ink provided the decorative layer 22 with a flat and smooth surface. As a result, the release layer 23, which was formed on the flat and smooth surface of the decorative layer 22, exhibited upgraded flatness and smoothness in the surface. All in all, it was possible to prevent the reflected light components emitted by the metallic layer 3 from scattering at the interface between the metallic layer 3 and the flat and smooth surface of the release layer 23 because the resulting overall roughness was lowered at the interface. Thus, it was possible to impart the decorative layer 22 profound metallic glosses securely.

COMPARATIVE EXAMPLE

A millimeter-electromagnetic-wave transmission cover according to Comparative Example differed from the millimeter-electromagnetic-wave transmission cover 8 according to the Embodiment of the present invention in that the decorative layer was printed directly onto the rear face of the transparent base by a screen printing method.

First of all, a black-colored pattern was formed on the ordinary sections in the rear face of the transparent base by screen printing, and was then dried. Moreover, a blue-colored pattern was formed on the ordinary sections in the rear face of the transparent base, on which the black-colored pattern had been formed, by screen printing, and was then dried. Thus, a two-colored decorative layer was formed. Subsequently, a metallic layer comprising indium was formed on the entire rear face of the transparent base by a vapor deposition method. Finally, the transparent base was subjected to insert molding to form the base layer of an acrylonitrile-ethylene-styrene (or AES) resinous material after providing the metallic layer with a holder or retainer coating on the surface.

When the millimeter-electromagnetic-wave transmission cover according to the Comparative Example was viewed on the front side, the metallic gloss of the metallic layer was not visible in the decorative layer, but only the black color and the rearward blue color could be seen. It is believed that the outcome had arisen because the decorative layer formed by screen printing had irregularities in the surface. Accordingly, many of incoming light components, which fell or struck on the metallic layer formed on that irregular surface, had reflected irregularly. Consequently, the color of the metallic layer had become less likely to be visible.

Having now fully described the present invention, it will be apparent to one of ordinary skill in the art that many changes and modifications can be made thereto without departing from the spirit or scope of the present invention as set forth herein including the appended claims.

What is claimed is:

1. A decorative member for vehicle, comprising:
a transparent base made from a resinous material and including a front face and a rear face, the rear face having an ordinary section and a recessed section dented more forward than is the ordinary section;
a transferred layer;
a metallic layer;
a base layer;
the transferred layer, the metallic layer and the base layer being disposed in this order on a rear-face side of the transparent base;
the transferred layer formed on the ordinary section in the rear face of transparent base;
the metallic layer formed on the ordinary section of the transparent base on which the transferred layer is formed and on the recessed section in the rear face of the transparent base;
the transferred layer including an adhesive layer provided on the ordinary section in the rear face of the transparent base, a decorative layer provided on the adhesive layer and a release layer provided on the decorative layer; the release layer including a first surface facing the decorative layer and a second surface facing the metallic layer at an opposite side to the first surface,
the second surface of the release layer exhibiting a surface roughness "Ra" of from 0.01 μm to 0.3 μm,
the metallic layer having a portion facing the second surface of the release layer exhibiting a surface roughness "Ra" of from 0.01 μm to 0.3 μm,
the metallic layer is a vapor deposition or sputtering film, and
the decorative layer having a surface exhibiting a surface roughness "Ra" of front 0.01 μm to 0.3 μm,
wherein the decorative member has a curved and forward-bulging shape.

2. The decorative member according to claim 1, wherein the release layer exhibits transparency.

3. The decorative member according to claim 1, wherein the decorative layer is a gravure printing layer.

4. The decorative member according to claim 1, wherein the transparent base further includes a perpendicular face extending perpendicularly to the ordinary section, and surrounding a peripheral rim of the ordinary section in the rear face.

5. The decorative member according to claim 1, wherein the release layer includes an acrylic resin.

6. An electromagnetic-wave transmission cover for transmitting a millimeter electromagnetic wave, comprising the decorative member according to claim 1 and having an overall thickness that is an integral multiple of a half of the wavelength λ of the millimeter electromagnetic wave.

* * * * *